(12) United States Patent
Tani et al.

(10) Patent No.: US 8,116,069 B2
(45) Date of Patent: Feb. 14, 2012

(54) ELECTROLYTIC CAPACITOR

(75) Inventors: Satoshi Tani, Kyoto (JP); Seitaro Onoue, Kyoto (JP); Takayuki Ueda, Kyoto (JP); Keiichiro Mizuta, Akashi (JP); Hironobu Hashimoto, Kawanishi (JP); Taisuke Kasahara, Suita (JP)

(73) Assignees: Nichicon Corporation, Kyoto (JP); Nippon Shokubai Co., Ltd, Osaka (JP)

( * ) Notice: Subject to any disclaimer, the term of this patent is extended or adjusted under 35 U.S.C. 154(b) by 397 days.

(21) Appl. No.: 12/096,418

(22) PCT Filed: Dec. 7, 2006

(86) PCT No.: PCT/JP2006/324893
§ 371 (c)(1),
(2), (4) Date: Nov. 13, 2009

(87) PCT Pub. No.: WO2007/066822
PCT Pub. Date: Jun. 14, 2007

(65) Prior Publication Data
US 2010/0053847 A1    Mar. 4, 2010

(30) Foreign Application Priority Data

Dec. 8, 2005  (JP) ................. 2005-354321

(51) Int. Cl.
*H01G 9/025* (2006.01)

(52) U.S. Cl. ....... 361/525; 361/516; 361/519; 361/523; 361/528; 361/530

(58) Field of Classification Search .......... 361/525, 361/516, 517, 519, 523, 528–529, 540, 509–512; 29/25.01, 25.03
See application file for complete search history.

(56) References Cited

U.S. PATENT DOCUMENTS
4,715,976 A    12/1987 Mori et al.
(Continued)

FOREIGN PATENT DOCUMENTS
EP    1394824    3/2004
(Continued)

OTHER PUBLICATIONS
International Search Report for PCT/JP2006/324893 dated Mar. 26, 2007.
(Continued)

*Primary Examiner* — Nguyen T Ha
(74) *Attorney, Agent, or Firm* — Turocy & Watson, LLP (57) ABSTRACT

Provide is an aluminum electrolytic capacitor exhibiting low specific resistance and low impedance property and realizing high reliability. An electrolytic capacitor has a structure in which: a capacitor element which is formed by rolling an anode foil and a cathode foil each connected with an electrode extraction lead through a separator and which is impregnated with a drive electrolytic solution is included in a cylindrical outer case having a closed-end; and an open end of the outer case is sealed with an elastic sealing body, in which: the drive electrolytic solution contains a tricyanomethide salt represented by the below-indicated chemical formula (1); and the drive electrolytic solution has a water content of 3.0 wt % or less:

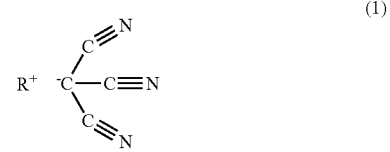

(1)

where, R represents a cation pairing with a tricyanomethide ion in formation of a tricyanomethide salt.

16 Claims, 3 Drawing Sheets

U.S. PATENT DOCUMENTS

| | | | |
|---|---|---|---|
| 5,160,653 A * | 11/1992 | Clouse et al. | 252/62.2 |
| 5,870,275 A | 2/1999 | Shiono et al. | |
| 6,307,732 B1 * | 10/2001 | Tsubaki et al. | 361/509 |
| 6,733,925 B2 * | 5/2004 | Hironaka et al. | 429/231.95 |
| 6,839,222 B2 * | 1/2005 | Takaoka et al. | 361/512 |
| 7,004,983 B2 * | 2/2006 | Honda et al. | 29/25.03 |
| 7,087,292 B2 * | 8/2006 | Sakai et al. | 428/209 |
| 7,858,242 B2 * | 12/2010 | Fujioka et al. | 429/324 |
| 2001/0012591 A1 | 8/2001 | Michot et al. | |
| 2002/0139553 A1 | 10/2002 | Minato et al. | |
| 2004/0002002 A1 | 1/2004 | Mizuta et al. | |

FOREIGN PATENT DOCUMENTS

| | | |
|---|---|---|
| JP | 62-145713 | 6/1987 |
| JP | 01-096918 | 4/1989 |
| JP | 11-186115 | 7/1999 |
| JP | 2004-292350 | 10/2004 |

OTHER PUBLICATIONS

Written Opinion of the International Searching Authority for PCT/JP2006/324893 dated Mar. 26, 2007.

Douglas R. McFarlane et al; Chem. Commun; 2001, p. 1430-1431.

* cited by examiner

ELECTROLYTIC CAPACITOR

TECHNICAL FIELD

The present invention relates to a long-life electrolytic capacitor to be used for electronic devices and having low impedance in a high frequency region.

BACKGROUND ART

An electrolytic capacitor refers to a capacitor employing as an electrode a so-called valve metal such as aluminum, tantalum, or niobium and including as a dielectric an oxide film layer formed through anode oxidation.

Figure 1:
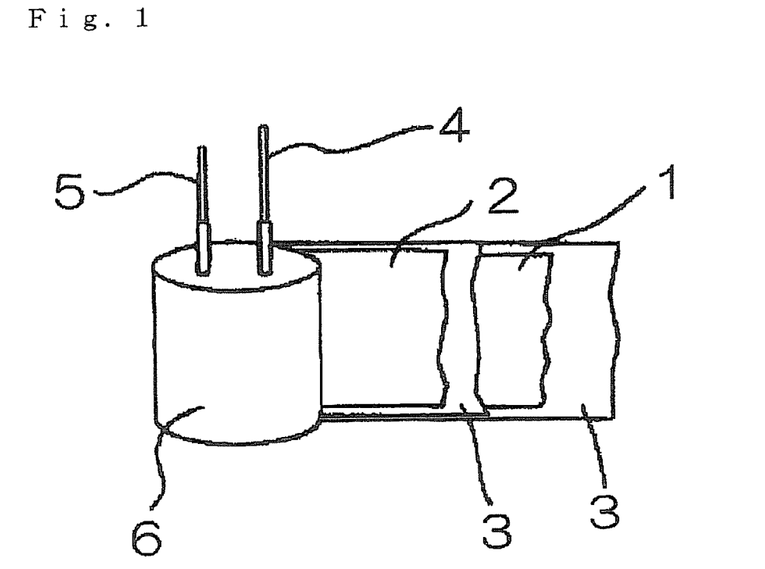
FIG. 1 is an exploded perspective view of an aluminum electrolytic capacitor element.
Figure 2:
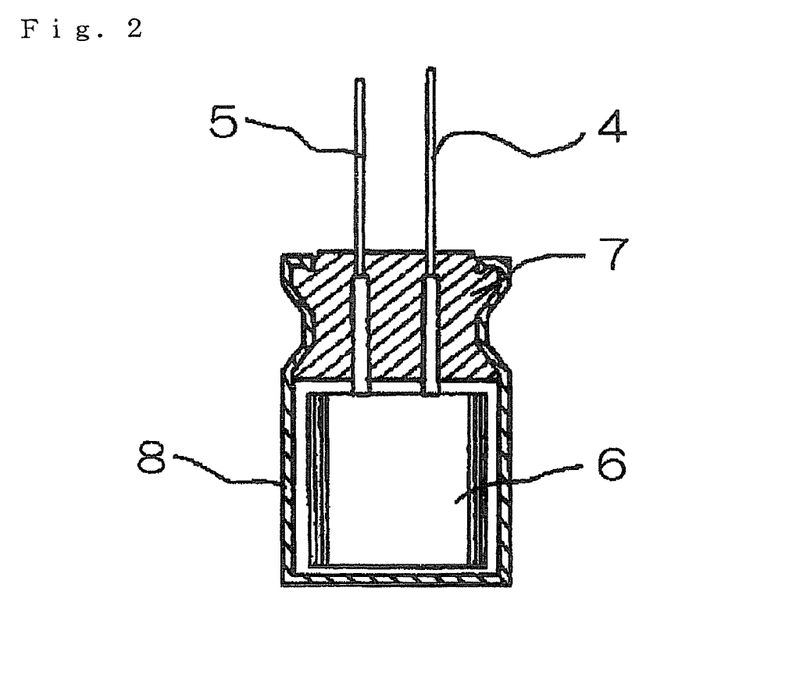
FIG. 2 is a front cutaway view of a main part of an aluminum electrolytic capacitor.

An aluminum electrolytic capacitor generally has a structure shown in FIGS. 1 and 2. A capacitor element 6 is formed by rolling an anode foil 1 and a cathode foil 2 each subjected to etching treatment and oxide film formation treatment through a separator 3. Then, the capacitor element is impregnated with an electrolytic solution, and included in a cylindrical outer case 8 having a closed-end.

Next, anode and cathode extraction leads 4 and 5 are inserted through and extracted from through-holes formed on an elastic sealing body 7. The sealing body (elastic sealing body) 7 formed of a material having elasticity is attached to an open end of the outer case, to thereby provide a structure sealed through drawing.

Figure 3:
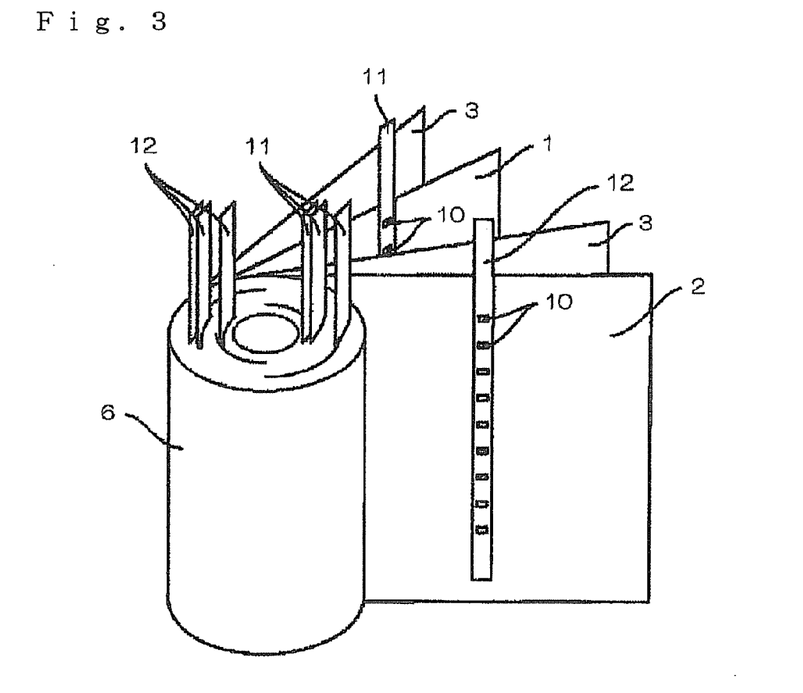
FIG. 3 is an exploded perspective view of an aluminum electrolytic capacitor element having a different structure from the structure of the aluminum electrolytic capacitor element of FIGS. 1 and 2.
Figure 4:
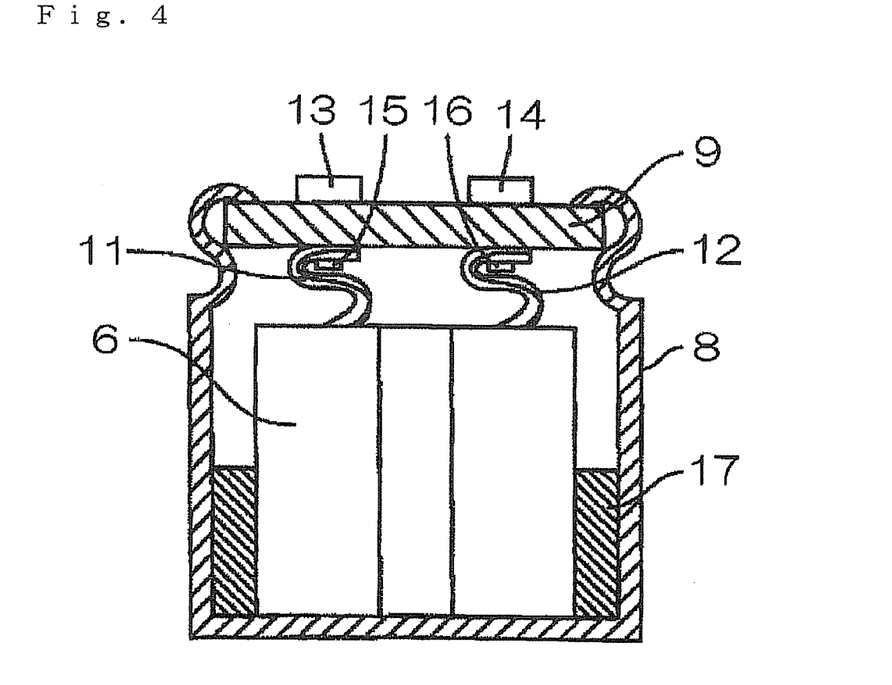
FIG. 4 is a front cutaway view of a main part of an aluminum electrolytic capacitor having a different structure from the structure of the aluminum electrolytic capacitor of FIGS. 1 and 2.

Another aluminum electrolytic capacitor has a structure shown in FIGS. 3 and 4. The capacitor element 6 is formed by rolling the anode foil 1 and the cathode foil 2 each subjected to etching treatment and oxide film formation treatment through the separator 3. Then, the capacitor element is impregnated with an electrolytic solution, and included in the cylindrical outer case 8 having a closed-end. A sealing body 9 is attached to an open end of the outer case 8, to thereby provide a structure sealed through drawing. The aluminum electrolytic capacitor may include an element fixing agent 17 for fixing the capacitor element 6 in the outer case 8.

An anode terminal 13 and a cathode terminal 14 are formed on an outer end surface of the sealing body 9, and lower ends of the terminals 13 and 14 as an anode internal terminal 15 and a cathode internal terminal 16 are respectively electrically connected to an anode tab terminal 11 and a cathode tab terminal 12, which are extracted from the capacitor element 6.

The anode tab terminal 11 to be used is subjected to oxide film formation treatment, but the cathode tab terminal 12 to be used is not subjected to oxide film formation treatment.

Each of the tab terminals 11 and 12 employs an aluminum foil subjected to no surface processing.

Figure 5:
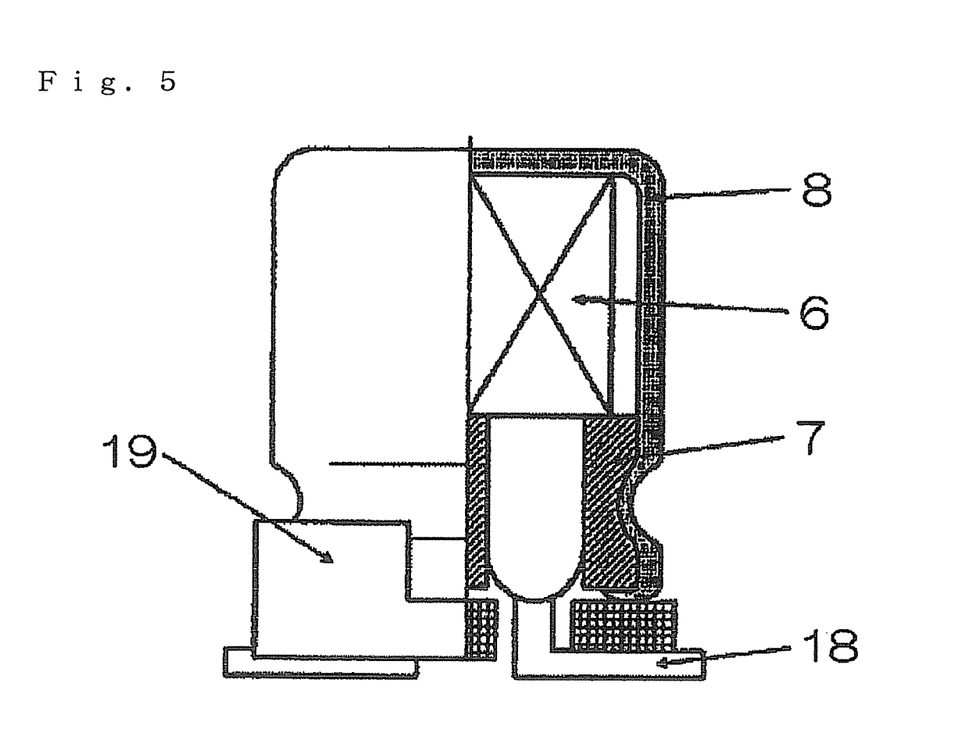
FIG. 5 is a front cutaway view of a main part of a chip aluminum electrolytic capacitor having a different structure from the structure of the aluminum electrolytic capacitor of FIGS. 1 to 4.

With reduction in size and thickness of electronic components and progress in high density surface mount technology, a chip shape has been required for an aluminum electrolytic capacitor, and a chip aluminum electrolytic capacitor has a structure shown in FIG. 5.

The capacitor element 6 is formed by rolling an anode foil and a cathode foil each subjected to etching treatment and oxide film formation treatment through a separator. Then, the capacitor element is impregnated with an electrolytic solution, and included in the cylindrical outer case 8 having a closed-end. An open end is sealed by using the elastic sealing body 7, to thereby form an aluminum electrolytic capacitor.

The aluminum electrolytic capacitor is arranged so as to be in direct contact with an extraction end surface of a lead terminal 18, and an insulating sheet 19 provided with a through-hole allowing the lead terminal 18 to pass through is attached, to thereby form a structure stably attached to a substrate.

The aluminum electrolytic capacitors each include a separator impregnated with an electrolytic solution between an anode foil and a cathode foil. The electrolytic solution functions as a true cathode, and has such a feature that the electrolytic solution having oxide film formation ability repairs an oxide film undergoing electrical breakdown due to electrical stress, mechanical stress, or the like. The electrolytic solution is therefore an important component providing a large effect in properties of the aluminum electrolytic capacitor.

Conventionally, there is known an electrolytic solution having high electric conductivity, mainly containing γ-butyrolactone as a solvent, and containing a tetraalkyl quaternary ammonium salt of a carboxylic acid such as phthalic acid or maleic acid as a solute to be used in an aluminum electrolytic capacitor having low impedance in a high frequency region (see JP-A-62-145713, for example).

However, the quaternary ammonium salt-based electrolytic solution has low reliability because its base component may ooze from a cathode sealed part.

For avoiding this ooze problem and satisfying low impedance required for an electrolytic capacitor, there is known a so-called amidine-based electrolytic solution containing as an electrolyte a quaternary carboxylic acid salt of a compound having an alkyl-substituted amidine group (see WO95/15572, for example).

The amidine-based electrolytic solution has a better effect of suppressing ooze of the electrolytic solution, but has comparable electric conductivity compared with those of a tetraalkyl quaternary ammonium salt. In general, the amidine-based electrolytic solution has a withstand voltage of about 50 V and can only be used for an aluminum electrolytic capacitor having a rated voltage of 35 V or less. The amidine-based electrolytic solution must have reduced solute concentration and significantly reduced electric conductivity, in order to be used for an aluminum electrolytic capacitor having a rated voltage of 50 V or more.

With recent reduction in size, improvement in performance, and increase in use temperature of electronic devices, an aluminum electrolytic capacitor is required to satisfy low energy loss, good impedance property in a wide temperature range, high withstand voltage property, and long-life property. However, no aluminum electrolytic capacitor has been realized to satisfy such properties.

In view of the circumstances described above, a compound having high withstand voltage and high electric conductivity is required as an electrolyte for an electrolytic solution to be used in an aluminum electrolytic capacitor.

An ionic liquid, which is a liquid at room temperature, has high electric conductivity and thus is probably effectively used as an electrolyte. However, an imidazolium salt or a pyridinium salt of a tetrafluoroboric acid anion, bis(trifluoromethane sulfonyl)imide anion, or the like contains a fluorine ion. Thus, such an imidazolium salt or a pyridinium salt has problems such as corrosion of an electrode, and is not a compound to be used for the aluminum electrolytic capacitor.

Thermal properties, viscosity, and qualitative electric stability of a dicyanoamide salt of N-alkyl-N-methyl pyrrolidium or 1-alkyl-3-methyl imidazolium as a non-fluorine-based ionic liquid are studied, and there is disclosed that such a dicyanoamide salt is effective as an ionic liquid (room temperature molten salt) having low viscosity (see Douglas R. MacFarlane et al., Chem. Commun., 2001, p. 1430-1431 and US2004/0002002, for example).

The above documents disclose a technique of applying an electrolytic solution containing an anion having a cyano group such as a dicyanoamide ion to an electrolytic solution material of an electrochemical device such as a lithium secondary battery.

DISCLOSURE OF THE INVENTION

Problem to be Solved by the Invention

For an amidine-based electrolytic solution, a technique of reducing a solute concentration is generally used for increasing withstand voltage. However, reduction in solute concentration increases a specific resistance of the electrolytic solution, and thus this technique has a problem in that high withstand voltage and low specific resistance cannot be attained at the same time.

According to studies conducted by the inventors of the present invention, a conventionally used dicyanoamide salt is unstable in water, and significantly degrades due to water included in a separator of an electrolytic capacitor or water entering from outside during long-term use. A case where a product contains a large volume of water has a problem in that initial withstand voltage property and electrical properties are hardly maintained over a long period of time.

The present invention has been made in view of solving the problems as described above, and an object of the present invention is therefore to provide an electrolytic capacitor satisfying low energy loss, low impedance property, high withstand voltage property, and high reliability.

Means for Solving the Problems

An electrolytic capacitor according to an embodiment of the present invention has a structure in which: a capacitor element, which is formed by rolling an anode foil and a cathode foil each connected with an electrode extraction lead through a separator, and is impregnated with a drive electrolytic solution is included in a cylindrical outer case having a closed-end; and an open end of the outer case is sealed with an elastic sealing body. The drive electrolytic solution contains a tricyanomethide salt represented by the below-indicated chemical formula (1); and the drive electrolytic solution has a water content of 3.0 wt % or less:

(1)

where, R represents a cation pairing with a tricyanomethide ion in formation of a tricyanomethide salt.

In one embodiment of the invention, the cation pairing with a tricyanomethide ion in the tricyanomethide salt is selected from the group consisting of: 1-methyl imidazolium; 1-methyl imidazolinium; 1-ethyl imidazolium; 1-ethyl imidazolinium; 1-n-propyl imidazolium; 1-n-propyl imidazolinium; 1,3-dimethyl imidazolium; 1,3-dimethyl imidazolinium; 1,2,3-trimethyl imidazolium; 1,2,3-trimethyl imidazolinium; 1-ethyl-3-methyl imidazolium; 1-ethyl-3-methyl imidazolinium; 1-ethyl-2,3-dimethyl imidazolium; 1-ethyl-2,3-dimethyl imidazolinium; 1,2,3,4-tetramethyl imidazolium; 1,2,3,4-tetramethyl imidazolinium; 1,3-diethyl imidazolium; 1,3-diethyl imidazolinium; 1-methyl-3-n-propyl imidazolium; 1-methyl-3-n-propyl imidazolinium; 2-ethyl-1,3-dimethyl imidazolium; 2-ethyl-1,3-dimethyl imidazolinium; 1,3-dimethyl-n-propyl imidazolium; 1,3-dimethyl-n-propyl imidazolinium; 1,3,4-trimethyl imidazolium; 1,3,4-trimethyl imidazolinium; 2-ethyl-1,3,4-trimethyl imidazolium; and 2-ethyl-1,3,4-trimethyl imidazolinium.

In another embodiment of the invention, the tricyanomethide salt includes one of: 1-ethyl-3-methyl imidazolium tricyanomethide; 1,3-dimethyl imidazolium tricyanomethide; and 1,2,3-trimethyl imidazolium tricyanomethide.

In still another embodiment of the invention, the drive electrolytic solution contains one or more solvents selected from the group consisting of γ-butyrolactone, sulfolane, 3-methyl sulfolane, ethylene glycol, and polyalkylene glycol and a copolymer thereof.

In still another embodiment of the invention, the elastic sealing body includes one of resin-vulcanized butyl rubber and peroxide-vulcanized butyl rubber.

In still another embodiment of the invention, the elastic sealing body has through-holes through which the electrode extraction leads are inserted; and the electrode extraction leads and the through-holes are sealed with a sealing material selected from the group consisting of an epoxy resin, a xylene resin, a guanamine resin, a phenol resin, a melamine resin, a furan resin, a silicone resin, a polyimide resin, silicone rubber, and butyl rubber.

Effect of the Invention

The electrolytic capacitor of the present invention employs an electrolytic solution containing a tricyanomethide salt as an electrolyte and having a water content of 3.0 wt % or less. Thus, a specific resistance can be reduced while reduction in withstand voltage is suppressed. Further, long-term reliability of electrical properties of the electrolytic capacitor can be improved.

In the case of applying a voltage under a condition where water easily enters from outside into the capacitor such as in a moisture tolerance test, alkalization of the electrolytic solution occurs in a vicinity of an cathode lead and ooze occurs due to degradation of sealing rubber. However, in the present invention, ooze can be prevented by sealing at least a cathode lead insertion port of the sealing rubber with a resin.

DESCRIPTION OF REFERENCE NUMERALS

1 ANODE FOIL
2 CATHODE FOIL
3 SEPARATOR

4 ANODE EXTRACTION LEAD
5 CATHODE EXTRACTION LEAD
6 CAPACITOR ELEMENT
7 ELASTIC SEALING BODY
8 OUTER CASE
9 SEALING BODY
10 CAULKING (or WELDING)
11 ANODE TAB TERMINAL
12 CATHODE TAB TERMINAL
13 ANODE TERMINAL
14 CATHODE TERMINAL
15 ANODE INTERNAL TERMINAL
16 CATHODE INTERNAL TERMINAL
17 ELEMENT FIXING AGENT
18 LEAD TERMINAL
19 INSULATING SHEET

BEST MODE FOR CARRYING OUT THE INVENTION

A drive electrolytic solution for an electrolytic capacitor of the present invention contains a tricyanomethide salt. This compound is represented by the general formula (1) described above. A cation pairing with a tricyanomethide ion is preferably a quaternary onium ion.

Specific examples of the cation include an imidazolium-based cation, an imidazolinium-based cation, a tetrahydropyrimidinium-based cation, and dihydropyrimidinium-based cation. Specific example of the imidazolium-based cation include 1-methylimidazolium, 1-ethylimidazolium, 1-n-propylimidazolium, 1,3-dimethylimidazolium, 1,2,3-trimethylimidazolium, 1-ethyl-3-methylimidazolium, 1-ethyl-2,3-dimethylimidazolium, 1,2,3,4-tetramethylimidazolium, 1,3-diethylimidazolium, 1-methyl-3-n-propylimidazolium, 2-ethyl-1,3-dimethylimidazolium, 1,3-dimethyl-2-n-propylimidazolium, 1,3,4-trimethylimidazolium, and 2-ethyl-1,3,4-trimethylimidazolium. Specific examples of the imidazolinium-based cation include 1-methylimidazolinium, 1-ethylimidazolinium, 1-n-propylimidazolinium, 1,3-dimethylimidazolinium, 1,2,3-trimethylimidazolinium, 1-ethyl-3-methylimidazolinium, 1-ethyl-2,3-dimethylimidazolinium, 1,2,3,4-tetramethylimidazolinium, 1,3-diethylimidazolinium, 1-methyl-3-n-propylimidazolinium, 2-ethyl-1,3-dimethylimidazolinium, 1,3-dimethyl-2-n-propylimidazolinium, 1,3,4-trimethylimidazolinium, and 2-ethyl-1,3,4-trimethylimidazolinium. Specific examples of the tetrahydropyrimidinium-based cation include 1,3-dimethyl-1,4,5,6-tetrahydropyrimidinium, 1,2,3-trimethyl-1,4,5,6-tetrahydropyrimidinium, 1,2,3,4-tetramethyl-1,4,5,6-tetrahydropyrimidinium, 1,2,3,5-tetramethyl-1,4,5,6-tetrahydropyrimidinium, 1-methyl-1,8-diazabicyclo[5.4.0]undecene-7, and 1-methyl-1,5-diazabicyclo[4.3.0]nonene-5. Specific examples of the dihydropyrimidinium-based cation include 1,3-dimethyl-1,4-dihydropyrimidinium, 1,3-dimethyl-1,6-dihydropyrimidinium, 1,2,3-trimethyl-1,4-dihydropyrimidinium, 1,2,3-trimethyl-1,6-dihydropyrimidinium, 1,2,3,4-tetramethyl-1,4-dihydropyrimidinium, 1,2,3,4-tetramethyl-1,6-dihydropyrimidinium, 1,2,3,5-tetramethyl-1,4-dihydropyrimidinium, and 1,2,3,5-tetramethyl-1,6-dihydropyrimidinium.

Most preferred structures for the cation of the tricyanomethide salt represented by the general formula (1) include: 1-ethyl-3-methyl imidazolium; 1,3-dimethyl imidazolium; and 1,2,3-trimethyl imidazolium.

In the electrolytic solution to be used in the present invention, a concentration of the tricyanomethide salt represented by the general formula (1) and serving as a solute is preferably 5 to 99.99 wt %. A concentration of less than 5 wt % may not provide an intended high electric conductivity.

A water content in the drive electrolytic solution to be used in the present invention is 3.0 wt % or less. A water content in the electrolytic solution of more than 3.0 wt % may increase change in tan δ in a reliability test.

Examples of a solvent to be used for the electrolytic solution of the present invention include alcohols, ethers, amides, oxazolidinones, lactones, nitriles, carbonates, and sulfones. The solvents may be used alone or in combination. Specific examples of the solvent are described below.

Examples of the alcohols include methyl alcohol, ethyl alcohol, propyl alcohol, butyl alcohol, diacetone alcohol, benzyl alcohol, amyl alcohol, furfuryl alcohol, ethylene glycol, propylene glycol, diethylene glycol, hexylene glycol, glycerine, and hexitol.

Examples of the ethers include ethylene glycol monomethyl ether, ethylene glycolmonoethyl ether, diethylene glycol monomethyl ether, diethylene glycol monoethyl ether, ethylene glycol phenyl ether, tetrahydrofuran, 3-methyltetrahydrofuran, ethylene glycol dimethyl ether, ethylene glycol diethyl ether, diethylene glycol dimethyl ether, and diethylene glycol diethyl ether.

Examples of a high molecular weight solvent include: polyalkylene glycol such as polyethylene glycol or polypropylene glycol; and a copolymer thereof (hereinafter, collectively referred to as polyalkylene glycol).

Examples of the amides include N-methylformamide, N,N-dimethylformamide, N-ethylformamide, N,N-diethylformamide, N-methylacetamide, N,N-dimethylacetamide, N-ethylacetamide, N,N-diethylacetamide, and hexamethylphosphoric amide.

Examples of the oxazolidinones include N-methyl-2-oxazolidinone and 3,5-dimethyl-2-oxazolidinone.

Examples of the lactones include γ-butyrolactone, α-acetyl-γ-butyrolactone, β-butyrolactone, γ-valerolactone, and δ-valerolactone.

Examples of the nitriles include acetonitrile, acrylonitrile, adiponitrile, and 3-methoxypropionitrile.

Examples of the carbonates include ethylene carbonate and propylene carbonate.

Examples of the sulfones include dimethyl sulfone, ethylmethyl sulfone, diethyl sulfone, sulfolane, 3-methyl sulfolane, and 2,4-dimethyl sulfolane.

Examples of the other solvents include N-methyl-2-pyrrolidone, dimethylsulfoxide, 1,3-dimethyl-2-imidazolidinone, toluene, xylene, and paraffins.

Of the above-mentioned solvents, γ-butyrolactone is preferred.

Other preferred examples of the solvent include sulfolane, 3-methyl sulfolane, ethylene glycol, and polyalkylene glycol. The solvent is used, to thereby suppress an internal pressure of a capacitor and exhibit stable electric properties. As a result, an aluminum electrolytic capacitor having excellent heat stability and high reliability can be obtained. The solvent described above and γ-butyrolactone may be used in combination.

The electrolytic solution to be used in the present invention may contain various additives in accordance with the purpose. Examples of the purpose for adding the additives include improvement in heat stability, suppression in electrode degradation such as hydration, and improvement in withstand voltage. A content of the additives is not particularly limited, and is preferably within a range of 0.01 to 20 wt %, and more preferably within a range of 0.01 to 10 wt %.

Examples of the additives include: a phosphoric acid compound such as orthophosphoric acid, phosphorous acid, hypophosphorous acid, pyrophosphoric acid, polyphosphoric acid, methyl phosphate, ethyl phosphate, butyl phosphate, isopropyl phosphate, dibutyl phosphate, and dioctyl phosphate; boric acid and a boric acid compound such as a complex compound of boric acid; polyhydric alcohols such as mannitol, sorbitol, xylitol, pentaerythritol, and polyvinyl alcohol; and a silicon compound such as colloidal silica, aluminosilicate, a silicone compound (such as hydroxy-modified silicone, amino-modified silicone, carboxy-modified silicone, alcohol-modified silicone, or epoxy-modified silicone, which is reactive silicone), or a silane coupling agent (such as 3-glycidoxypropyl trimethoxysilane, vinyl trimethoxysilane, or ethyl triethoxysilane).

The electrolytic solution to be used in the present invention may form a gel electrolyte. The gel electrolyte is formed by: forming a gel substance by polymerizing a radical polymerizable monomer (such as acrylic acid, an acrylic ester-based monomer, or a divinyl-based monomer such as polyethylene glycol dimethacrylate) with a polymerization initiator (such as dibenzoyl peroxide or 2,2'-azobisisobutyronitrile); and using the gel substance as a solvent.

The aluminum electrolytic capacitor of the present invention generally has a structure shown in FIGS. 1 and 2. A capacitor element 6 is formed by rolling an anode foil 1 and a cathode foil 2 each subjected to etching treatment and oxide film formation treatment through a separator 3. Then, the capacitor element is impregnated with an electrolytic solution, and included in a cylindrical outer case 8 having a closed-end.

Next, anode and cathode extraction leads 4 and 5 are inserted through and extracted from through-holes formed on an elastic sealing body 7. The elastic sealing body 7 is attached to an open end of the outer case, to thereby provide a structure sealed through drawing.

The aluminum electrolytic capacitor of the present invention may have a structure shown in FIGS. 3 and 4. The capacitor element 6 is formed by rolling the anode foil 1 and the cathode foil 2 each subjected to etching treatment and oxide film formation treatment through the separator 3. Then, the capacitor element is impregnated with an electrolytic solution, and included in the cylindrical outer case 8 having a closed-end.

A sealing body 9 is attached to an open end of the outer case 8, to thereby provide a structure sealed through drawing. The aluminum electrolytic capacitor may include an element fixing agent 17 for fixing the capacitor element 6 in the outer case 8. An anode terminal 13 and a cathode terminal 14 are formed on an outer end surface of the sealing body 9, and lower ends of the terminals 13 and 14 as an anode internal terminal 15 and a cathode internal terminal 16 are respectively electrically connected to an anode tab terminal 11 and a cathode tab terminal 12, which are extracted from the capacitor element 6.

The anode tab terminal 11 to be used is subjected to oxide film formation treatment, but the cathode tab terminal 12 to be used is not subjected to oxide film formation treatment.

The present invention allows surface mount by forming a chip aluminum electrolytic capacitor having a structure shown in FIG. 5. This aluminum electrolytic capacitor has the same structure as that of FIG. 2, and the aluminum electrolytic capacitor is arranged so as to be in direct contact with an extraction end surface of a lead terminal 18, and an insulating sheet 19 provided with a through-hole allowing the lead terminal 18 to pass through is attached, to thereby form a structure stably attached to a substrate.

FIGS. 1 to 5 each show a structure of the aluminum electrolytic capacitor. The basic structure is common, and thus the same reference numerals are used for the same parts.

The outer case for the aluminum electrolytic capacitor of the present invention employs aluminum or aluminum alloy.

Further, inside of the outer case forming the aluminum electrolytic capacitor of the present invention may be provided with: orthophosphoric acid, phosphates, hypophosphorous acid, phosphorous acid, pyrophosphoric acid, polyphosphoric acid, or a salt thereof; a silicone compound (such as hydroxy-modified silicone, amino-modified silicone, carboxy-modified silicone, alcohol-modified silicone, or epoxy-modified silicone, which is reactive silicone); or a silane coupling agent (such as 3-glycidoxypropyl trimethoxysilane, vinyl trimethoxysilane, or ethyl triethoxysilane).

The anode foil in the aluminum electrolytic capacitor of the present invention employs an anode foil prepared by: subjecting an aluminum foil having a purity of 99% or more to chemical or electrochemical etching treatment in an acidic solution; and then subjecting the resultant to oxide film formation treatment in an aqueous solution of adipic acid, boric acid, phosphoric acid, or the like to form a dielectric layer.

The cathode foil in the aluminum electrolytic capacitor of the present invention employs a cathode foil prepared by subjecting an aluminum foil having a purity of 99% or more to chemical or electrochemical etching treatment in an acidic solution. Also, the cathode foil may employ a cathode foil further subjected to oxide film formation treatment at a formation voltage of 0.1 to 5 V.

Further, the cathode foil may employ: an cathode foil coated with a metal nitride such as titanium nitride, zirconium nitride, tantalum nitride, or niobium nitride, or a metal such as titanium, zirconium, tantalum, or niobium by an appropriate method such as an evaporation method, a plating method, or application; or an aluminum alloy foil containing copper.

An electrode surface of at least one of the anode foil and the cathode foil in the aluminum electrolytic capacitor of the present invention may be provided with: orthophosphoric acid, phosphates, hypophosphorous acid, phosphorous acid, pyrophosphoric acid, polyphosphoric acid, or a salt thereof; a silicone compound (such as hydroxy-modified silicone, amino-modified silicone, carboxy-modified silicone, alcohol-modified silicone, or epoxy-modified silicone, which is reactive silicone); or a silane coupling agent (such as 3-glycidoxypropyl trimethoxysilane, vinyl trimethoxysilane, or ethyl triethoxysilane).

The separator in the aluminum electrolytic capacitor of the present invention generally employs Manila hemp, esparto, cotton, paper such as craft paper, or the like. More preferably, a separator formed of Manila hemp or esparto as a raw material is used.

The separator preferably has low density and small thickness within a range causing no short out failures, to thereby satisfy low impedance property. Further, a polymer porous film formed of polypropylene, polyethylene, Teflon (registered trademark), or the like, or paper or a non-woven fabric each employing a polymer fiber of such polymer may also be used.

The separator in the aluminum electrolytic capacitor of the present invention may be provided with or may contain: orthophosphoric acid, phosphates, hypophosphorous acid, phosphorous acid, pyrophosphoric acid, polyphosphoric acid, or a salt thereof; a silicone compound (such as hydroxy-modified silicone, amino-modified silicone, carboxy-modified silicone, alcohol-modified silicone, or epoxy-modified silicone, which is reactive silicone); or a silane coupling agent (such as 3-glycidoxypropyl trimethoxysilane, vinyl trimethoxysilane, or ethyl triethoxysilane).

The elastic sealing body 7 in the aluminum electrolytic capacitor of the present invention is formed of preferably butyl rubber, and particularly preferably resin-vulcanized or peroxide-vulcanized butyl rubber (especially preferably peroxide-partially vulcanized butyl rubber). Butyl rubber may be obtained by: adding a reinforcing agent (such as carbon black), a filler (such as clay or talc), a vulcanization agent (such as an alkylphenol formalin resin, a peroxide (such as dicumyl peroxide, 1,1-di-(t-butylperoxy)-3,3,5-trimethylcyclohexane or 2,5-dimethyl-2,5-di-(t-butylperoxy)hexane), quinoide (p-quinone dioxime or p,p'-dibenzoyl quinone dioxime), sulfur), a vulcanization acceleration assistant (such as steric acid or zinc oxide), a stabilizer (such as basic magnesium-aluminum-hydroxy-carbonate-hydrate, magnesium oxide, or alumina), and the like to a copolymer of isobutylene and isoprene as a rubber raw material; kneading the mixture; and stretching and forming the resultant.

In addition to the butyl rubber described above, an elastic body formed by using an ethylene-propylene-diene copolymer, a styrene-butadiene copolymer, a rubber raw material such as butadiene, isoprene, nitrile, or chloroprene, or special rubber such as chlorosulfonated polyethylene, chlorinated polyethylene, epichlorohydrin, or silicone may also be used as a sealing body.

For suppressing water to enter from an external environment or reducing permeability of a solvent vapor, a surface of the elastic sealing body of the present invention may be coated with a resin such as Teflon (registered trademark) or provided with a sheet formed of a phenol resin or the like.

As shown in FIG. 2, the electrolytic capacitor of the present invention preferably has a structure in which: the elastic sealing body 7 has through-holes through which the electrode extraction leads 4 and 5 are inserted; and the electrode extraction leads and the through-holes are sealed with a sealing material selected from an epoxy resin, a xylene resin, a guanamine resin, a phenol resin, a melamine resin, a furan resin, a silicone resin, a polyimide resin, silicone rubber, and butyl rubber. The sealing materials are provided in an inner wall part of the through-holes and an outer opened periphery part of the through-holes (a base part of the electrode extraction leads projecting from the elastic sealing body).

The sealing body 9 in the electrolytic capacitor of the present invention shown in FIG. 4 may employ: a sealing body formed of resin such as a styrene-butadiene copolymer, an ethylene-propylene-diene copolymer, polyphenylene sulfide, polypropylene, or silicone rubber; or a sealing body formed by laminating a phenol resin on the resins described above.

The anode extraction lead, the cathode extraction lead, and the lead terminals in the present invention are each formed of a copper-plated steel wire, a copper wire, a steel wire, or the like including: a connecting part in contact with an electrode foil; a round bar part integrally formed with the connecting part and formed of high purity aluminum; and an outer connecting part fixed to a tip of the round bar part and subjected to plating with tin, silver, or the like.

A surface of each of the connecting part and the round bar part, or a surface of at least the round bar part may be subjected to oxide film formation treatment through anode oxidation or may include an insulating layer formed by ceramic coating with $Al_2O_3$, $SiO_2$, $ZrO_2$, or the like.

In the present invention, the anode extraction lead and the cathode extraction lead, the anode tab terminal and the cathode tab terminal or any lead terminals, and the anode foil and the cathode foil are electrically connected by caulking or welding with ultrasonic waves.

An example of the insulating sheet includes a sheet formed of polyphenylene sulfide-based rigid plastic, nylon-based rigid plastic, or the like.

The present invention may employ not only the structure of the vertical chip aluminum electrolytic capacitor as shown in FIG. 5, but also a structure of a horizontal chip aluminum electrolytic capacitor prepared by: including the aluminum electrolytic capacitor shown in FIG. 2 into an outer case having a storage space appropriate for an external shape of the capacitor formed of a heat resistant resin such as an epoxy, phenol, or polyimide resin, a ceramic material, or the like; and folding lead wires extracted from the capacitor along an open end surface and a bottom surface of the outer case.

The structure of the aluminum electrolytic capacitor of the present invention may be used for a structure of a newly proposed aluminum electrolytic capacitor. An example of the aluminum electrolytic capacitor is an aluminum electrolytic capacitor having a structure in which an anode foil and a cathode foil each subjected to etching treatment and oxide film formation treatment are laminated through a separator.

EXAMPLES

The aluminum electrolytic capacitor of the present invention was produced through the procedure as described below.

The present invention may be applied to any structure. However, in Examples, the present invention will be described by using the structures shown in FIGS. 1 and 2 for clarity. Hereinafter, aluminum electrolytic capacitors to be used in Examples have the same structures.

First, electrolytic solutions having respective compositions described in Tables 1 to 3 were prepared. At this time, predetermined dehydration treatment was performed so as to adjust a water content of the electrolytic solution before adding pure water to substantially 0. Then, pure water was added in an amount described in Tables 1 to 3. Next, a capacitor element was formed (rated voltage of 6.3 V-1,000 μF (Φ10×12.5 mmL)) by rolling an anode foil and a cathode foil each subjected to etching treatment and oxide film formation treatment through a Manila hemp-based separator. The capacitor element was impregnated with the electrolytic solution, and was included in a cylindrical outer case having a closed-end and formed of aluminum.

Next, anode and cathode extraction leads were inserted through and extracted from through-holes formed on an elastic sealing body formed of butyl rubber. The elastic sealing body formed of butyl rubber was attached to an open end of the outer case for sealing through drawing, to thereby produce an aluminum electrolytic capacitor having a sectional structure shown in FIG. 2. Then, a specific resistance of the electrolytic solution was measured at 30° C.

Note that, the electrolytic solutions of Tables 1 to 3 include: electrolytic solutions of Examples 1 to 4 having varying concentrations of 1-ethyl-3-methyl imidazolium tricyanomethide; electrolytic solutions of Examples 5 and 6 and Comparative Example 1 each containing 1-ethyl-3-methyl imidazolium tricyanomethide and pure water; electrolytic solutions of Examples 7 to 9 and Comparative Example 2 each containing 1,3-dimethyl imidazolium tricyanomethide; and electrolytic solutions of Examples 10 to 12 and Comparative Example 3 each containing 1,2,3-trimethyl imidazolium tricyanomethide.

Other electrolytic solutions include: electrolytic solutions of Conventional Examples 1 to 4 each containing no tricyanomethide; electrolytic solutions of Examples 13 to 18 and Comparative Example 4 each containing tricyanomethide described above and silane; electrolytic solutions of Examples 19 to 26 and Comparative Example 5 each containing tricyanomethide described above and sulfolane; and electrolytic solutions of Examples 27 to 35 and Comparative Example 6 each containing tricyanomethide described above and polyalkylene glycol. Conventional Example 5 is a conventional example corresponding to Examples 19 to 26, and Conventional Example 6 is a conventional example corresponding to Examples 27 to 35.

Polyalkylene glycol used in Examples 27 to 35, Comparative Example 6, and Conventional Example 6 is a compound represented by the following chemical formula (2). In the formula, m and n each represent a natural number of 1 or more.

Chemical formula (2)

TABLE 1

| | Electrolytic solution composition | (Weight %) | Electrolytic solution | Specific resistance (Ω · cm) |
|---|---|---|---|---|
| Example 1 | γ-Butyrolactone | 65.0 | Electrolytic solution 1 | 30 |
| | 1-Ethyl-3-methyl imidazolium tricyanomethide | 35.0 | | |
| Example 2 | γ-Butyrolactone | 90.0 | Electrolytic solution 2 | 38 |
| | 1-Ethyl-3-methyl imidazolium tricyanomethide | 10.0 | | |
| Example 3 | γ-Butyrolactone | 50.0 | Electrolytic solution 3 | 27 |
| | 1-Ethyl-3-methyl imidazolium tricyanomethide | 50.0 | | |
| Example 4 | γ-Butyrolactone | 15.0 | Electrolytic solution 4 | 34 |
| | 1-Ethyl-3-methyl imidazolium tricyanomethide | 85.0 | | |
| Example 5 | γ-Butyrolactone | 64.0 | Electrolytic solution 5 | 30 |
| | 1-Ethyl-3-methyl imidazolium tricyanomethide | 35.0 | | |
| | Pure water | 1.0 | | |
| Example 6 | γ-Butyrolactone | 62.0 | Electrolytic solution 6 | 28 |
| | 1-Ethyl-3-methyl imidazolium tricyanomethide | 35.0 | | |
| | Pure water | 3.0 | | |
| Comparative Example 1 | γ-Butyrolactone | 61.0 | Electrolytic solution 7 | 26 |
| | 1-Ethyl-3-methyl imidazolium tricyanomethide | 35.0 | | |
| | Pure water | 4.0 | | |
| Example 7 | γ-Butyrolactone | 65.0 | Electrolytic solution 8 | 30 |
| | 1,3-Dimethyl imidazolium tricyanomethide | 35.0 | | |
| Example 8 | γ-Butyrolactone | 64.0 | Electrolytic solution 9 | 30 |
| | 1,3-Dimethyl imidazolium tricyanomethide | 35.0 | | |
| | Pure water | 1.0 | | |
| Example 9 | γ-Butyrolactone | 62.0 | Electrolytic solution 10 | 28 |
| | 1,3-Dimethyl imidazolium tricyanomethide | 35.0 | | |
| | Pure water | 3.0 | | |
| Comparative Example 2 | γ-Butyrolactone | 61.0 | Electrolytic solution 11 | 27 |
| | 1,3-Dimethyl imidazolium tricyanomethide | 35.0 | | |
| | Pure water | 4.0 | | |
| Example 10 | γ-Butyrolactone | 65.0 | Electrolytic solution 12 | 31 |
| | 1,2,3-Trimethyl imidazolium tricyanomethide | 35.0 | | |
| Example 11 | γ-Butyrolactone | 64.0 | Electrolytic solution 13 | 30 |
| | 1,2,3-Trimethyl imidazolium tricyanomethide | 35.0 | | |
| | Pure water | 1.0 | | |
| Example 12 | γ-Butyrolactone | 62.0 | Electrolytic solution 14 | 28 |
| | 1,2,3-Trimethyl imidazolium tricyanomethide | 35.0 | | |
| | Pure water | 3.0 | | |
| Comparative Example 3 | γ-Butyrolactone | 61.0 | Electrolytic solution 15 | 27 |
| | 1,2,3-Trimethyl imidazolium tricyanomethide | 35.0 | | |
| | Pure water | 4.0 | | |
| Conventional Example 1 | γ-Butyrolactone | 65.0 | Electrolytic solution 16 | 75 |
| | 1,2,3,4-Tetramethyl imidazolinium hydrogen phthalate | 35.0 | | |
| Conventional Example 2 | γ-Butyrolactone | 64.0 | Electrolytic solution 17 | 74 |
| | 1,2,3,4-Tetramethyl imidazolinium hydrogen phthalate | 35.0 | | |
| | Pure water | 1.0 | | |
| Conventional Example 3 | γ-Butyrolactone | 62.0 | Electrolytic solution 18 | 72 |
| | 1,2,3,4-Tetramethyl imidazolinium hydrogen phthalate | 35.0 | | |
| | Pure water | 3.0 | | |
| Conventional Example 4 | γ-Butyrolactone | 61.0 | Electrolytic solution 19 | 71 |
| | 1,2,3,4-Tetramethyl imidazolinium hydrogen phthalate | 35.0 | | |
| | Pure water | 4.0 | | |
| Example 13 | γ-Butyrolactone | 64.0 | Electrolytic solution 20 | 31 |
| | 1-Ethyl-3-methyl imidazolium tricyanomethide | 35.0 | | |
| | Methyl triethoxy silane | 1.0 | | |

TABLE 2

| | | | | |
|---|---|---|---|---|
| Example 14 | γ-Butyrolactone | 60.0 | Electrolytic solution 21 | 32 |
| | 1-Ethyl-3-methyl imidazolium tricyanomethide | 35.0 | | |
| | Methyl triethoxy silane | 5.0 | | |
| Example 15 | γ-Butyrolactone | 61.0 | Electrolytic solution 22 | 29 |
| | 1-Ethyl-3-methyl imidazolium tricyanomethide | 35.0 | | |
| | Methyl triethoxy silane | 1.0 | | |
| | Pure water | 3.0 | | |
| Comparative Example 4 | γ-Butyrolactone | 60.0 | Electrolytic solution 23 | 28 |
| | 1-Ethyl-3-methyl imidazolium tricyanomethide | 35.0 | | |
| | Methyl triethoxy silane | 1.0 | | |
| | Pure water | 4.0 | | |
| Example 16 | γ-Butyrolactone | 61.0 | Electrolytic solution 24 | 31 |
| | 1-Ethyl-3-methyl imidazolium tricyanomethide | 35.0 | | |
| | Dimethoxy dimethyl silane | 1.0 | | |
| | Pure water | 3.0 | | |
| Example 17 | γ-Butyrolactone | 61.0 | Electrolytic solution 25 | 32 |
| | 1,3-Dimethyl imidazolium tricyanomethide | 35.0 | | |
| | Dimethoxy dimethyl silane | 1.0 | | |
| | Pure water | 3.0 | | |
| Example 18 | γ-Butyrolactone | 61.0 | Electrolytic solution 26 | 30 |
| | 1,2,3-Trimethyl imidazolium tricyanomethide | 35.0 | | |
| | Methyl triethoxy silane | 1.0 | | |
| | Pure water | 3.0 | | |
| Example 19 | γ-Butyrolactone | 50.0 | Electrolytic solution 27 | 40 |
| | Sulfolane | 15.0 | | |
| | 1-Ethyl-3-methyl imidazolium tricyanomethide | 35.0 | | |
| Example 20 | γ-Butyrolactone | 35.0 | Electrolytic solution 28 | 35 |
| | Sulfolane | 15.0 | | |
| | 1-Ethyl-3-methyl imidazolium tricyanomethide | 50.0 | | |
| Example 21 | Sulfolane | 15.0 | Electrolytic solution 29 | 45 |
| | 1-Ethyl-3-methyl imidazolium tricyanomethide | 85.0 | | |
| Example 22 | γ-Butyrolactone | 35.0 | Electrolytic solution 30 | 45 |
| | Sulfolane | 30.0 | | |
| | 1-Ethyl-3-methyl imidazolium tricyanomethide | 35.0 | | |
| Example 23 | γ-Butyrolactone | 15.0 | Electrolytic solution 31 | 80 |
| | Sulfolane | 50.0 | | |
| | 1-Ethyl-3-methyl imidazolium tricyanomethide | 35.0 | | |
| Example 24 | γ-Butyrolactone | 47.0 | Electrolytic solution 32 | 38 |
| | Sulfolane | 15.0 | | |
| | 1-Ethyl-3-methyl imidazolium tricyanomethide | 35.0 | | |
| | Pure water | 3.0 | | |
| Comparative Example 5 | γ-Butyrolactone | 46.0 | Electrolytic solution 33 | 37 |
| | Sulfolane | 15.0 | | |
| | 1-Ethyl-3-methyl imidazolium tricyanomethide | 35.0 | | |
| | Pure water | 4.0 | | |
| Example 25 | γ-Butyrolactone | 50.0 | Electrolytic solution 34 | 41 |
| | Sulfolane | 15.0 | | |
| | 1,2,3-Trimethyl imidazolium tricyanomethide | 35.0 | | |
| Example 26 | γ-Butyrolactone | 50.0 | Electrolytic solution 35 | 40 |
| | Sulfolane | 15.0 | | |
| | 1,3-Dimethyl imidazolium tricyanomethide | 35.0 | | |
| Conventional Example 5 | γ-Butyrolactone | 50.0 | Electrolytic solution 36 | 100 |
| | Sulfolane | 15.0 | | |
| | 1,2,3,4-Tetramethyl imidazolinium hydrogen phthalate | 35.0 | | |

TABLE 3

| | | | | |
|---|---|---|---|---|
| Example 27 | γ-Butyrolactone | 50.0 | Electrolytic solution 37 | 90 |
| | Polyalkylene glycol (m:n = 7:3, m + n = 60) | 15.0 | | |
| | 1-Ethyl-3-methyl imidazolium tricyanomethide | 35.0 | | |
| Example 28 | γ-Butyrolactone | 35.0 | Electrolytic solution 38 | 85 |
| | Polyalkylene glycol (m:n = 7:3, m + n = 60) | 15.0 | | |
| | 1-Ethyl-3-methyl imidazolium tricyanomethide | 50.0 | | |
| Example 29 | Polyalkylene glycol (m:n = 7:3, m + n = 60) | 15.0 | Electrolytic solution 39 | 95 |
| | 1-Ethyl-3-methyl imidazolium tricyanomethide | 85.0 | | |
| Example 30 | γ-Butyrolactone | 35.0 | Electrolytic solution 40 | 170 |
| | Polyalkylene glycol (m:n = 7:3, m + n = 60) | 30.0 | | |
| | 1-Ethyl-3-methyl imidazolium tricyanomethide | 35.0 | | |
| Example 31 | γ-Butyrolactone | 15.0 | Electrolytic solution 41 | 420 |
| | Polyalkylene glycol (m:n = 7:3, m + n = 60) | 50.0 | | |
| | 1-Ethyl-3-methyl imidazolium tricyanomethide | 35.0 | | |
| Example 32 | γ-Butyrolactone | 50.0 | Electrolytic solution 42 | 90 |
| | Polyalkylene glycol (m:n = 7:3, m + n = 60) | 15.0 | | |
| | 1,2,3-Trimethyl imidazolium tricyanomethide | 35.0 | | |

TABLE 3-continued

| | | | | |
|---|---|---|---|---|
| Example 33 | γ-Butyrolactone | 50.0 | Electrolytic solution 43 | 89 |
| | Polyalkylene glycol (m:n = 6:4, m + n = 50) | 15.0 | | |
| | 1,3-Dimethyl imidazolium tricyanomethide | 35.0 | | |
| Example 34 | γ-Butyrolactone | 50.0 | Electrolytic solution 44 | 91 |
| | Polyalkylene glycol (m:n = 8:2, m + n = 35) | 15.0 | | |
| | 1-Ethyl-3-methyl imidazolium tricyanomethide | 35.0 | | |
| Example 35 | γ-Butyrolactone | 47.0 | Electrolytic solution 45 | 86 |
| | Polyalkylene glycol (m:n = 7:3, m + n = 60) | 15.0 | | |
| | 1-Ethyl-3-methyl imidazolium tricyanomethide | 35.0 | | |
| | Pure water | 3.0 | | |
| Comparative Example 6 | γ-Butyrolactone | 46.0 | Electrolytic solution 46 | 85 |
| | Polyalkylene glycol (m:n = 7:3, m + n = 60) | 15.0 | | |
| | 1-Ethyl-3-methyl-imidazolium tricyanomethide | 35.0 | | |
| | Pure water | 4.0 | | |
| Conventional Example 6 | γ-Butyrolactone | 50.0 | Electrolytic solution 47 | 130 |
| | Polyalkylene glycol (m:n = 7:3, m + n = 60) | 15.0 | | |
| | 1,2,3,4-Tetramethyl imidazolinium hydrogen phthalate | 35.0 | | |

Tables 1 to 3 reveal that the electrolytic solution of each of Examples (Examples 1 to 12) of the present invention exhibited a low specific resistance compared with that of the conventional electrolytic solution (Conventional Examples 1 to 4) containing no tricyanomethide. The electrolytic solution of each of Examples (Examples 13 to 18 and 19 to 26) of the present invention containing silane or sulfolane also exhibited a low specific resistance compared with that of the conventional electrolytic solution (Conventional Example 5) containing no tricyanomethide.

Further, the electrolytic solution of each of Examples (Examples 27 to 35) of the present invention containing polyalkylene glycol also exhibited a low specific resistance compared with that of the conventional electrolytic solution (Conventional Example 6) containing no tricyanomethide and containing 15.0 wt % of polyalkylene glycol.

Ten aluminum electrolytic capacitors each having a rated voltage of 6.3 V-1,000 μF (Φ10×12.5 mmL) were produced by using the electrolytic solutions of Tables 1 to 3. Capacitance at 120 Hz and initial tan δ property of each of the aluminum electrolytic capacitors were measured, and then a high temperature application test (105° C., 3,000 h, DC 6.3 V applied) was conducted.

Impedance of the aluminum electrolytic capacitors at 20° C. and 100 kHz was measured. Tables 4 and 5 show the results.

TABLE 4

| | Initial properties | | | 105° C., Applied voltage of DC 6.3 V, after 3,000 h | | | |
|---|---|---|---|---|---|---|---|
| | Capacitance (μF) | tan δ | Impedance at 100 kHz (mΩ) | Capacitance (μF) | Change in capacitance (%) | tan δ | Change in tan δ (%) |
| Example 1 | 994 | 0.036 | 15 | 911 | −8.4 | 0.053 | 47.2 |
| Example 2 | 994 | 0.042 | 19 | 889 | −10.6 | 0.058 | 38.1 |
| Example 3 | 991 | 0.039 | 14 | 917 | −7.5 | 0.061 | 56.4 |
| Example 4 | 989 | 0.041 | 17 | 942 | −4.8 | 0.068 | 65.9 |
| Example 5 | 988 | 0.039 | 15 | 908 | −8.1 | 0.058 | 48.7 |
| Example 6 | 991 | 0.039 | 14 | 910 | −8.2 | 0.060 | 53.8 |
| Comparative Example 1 | 992 | 0.038 | 14 | 907 | −8.6 | 0.085 | 123.7 |
| Example 7 | 991 | 0.035 | 15 | 910 | −8.2 | 0.052 | 48.6 |
| Example 8 | 989 | 0.036 | 15 | 910 | −8.0 | 0.054 | 50.0 |
| Example 9 | 988 | 0.035 | 14 | 907 | −8.2 | 0.056 | 60.0 |
| Comparative Example 2 | 990 | 0.034 | 14 | 906 | −8.5 | 0.084 | 147.1 |
| Example 10 | 989 | 0.035 | 16 | 910 | −8.0 | 0.052 | 48.6 |
| Example 11 | 991 | 0.036 | 15 | 909 | −8.3 | 0.053 | 47.2 |
| Example 12 | 990 | 0.034 | 14 | 907 | −8.4 | 0.052 | 52.9 |
| Comparative Example 3 | 989 | 0.033 | 14 | 905 | −8.5 | 0.080 | 142.4 |
| Conventional Example 1 | 988 | 0.055 | 30 | 900 | −8.9 | 0.082 | 49.1 |
| Conventional Example 2 | 986 | 0.053 | 30 | 898 | −8.9 | 0.080 | 50.9 |
| Conventional Example 3 | 992 | 0.052 | 29 | 901 | −9.2 | 0.081 | 55.8 |
| Conventional Example 4 | 993 | 0.052 | 28 | 900 | −9.4 | 0.085 | 63.5 |
| Example 13 | 990 | 0.040 | 15 | 910 | −8.1 | 0.055 | 37.5 |
| Example 14 | 991 | 0.040 | 15 | 910 | −8.2 | 0.054 | 35.0 |
| Example 15 | 988 | 0.039 | 15 | 905 | −8.4 | 0.055 | 41.0 |
| Comparative Example 4 | 990 | 0.039 | 14 | 904 | −8.7 | 0.081 | 107.7 |

TABLE 4-continued

|  | Initial properties | | | 105° C., Applied voltage of DC 6.3 V, after 3,000 h | | | |
| --- | --- | --- | --- | --- | --- | --- | --- |
|  | Capacitance (μF) | tan δ | Impedance at 100 kHz (mΩ) | Capacitance (μF) | Change in capacitance (%) | tan δ | Change in tan δ (%) |
| Example 16 | 990 | 0.040 | 15 | 904 | −8.7 | 0.059 | 47.5 |
| Example 17 | 988 | 0.040 | 15 | 903 | −8.6 | 0.060 | 50.0 |
| Example 18 | 991 | 0.039 | 15 | 904 | −8.8 | 0.059 | 51.3 |

TABLE 5

| Example 19 | 990 | 0.042 | 19 | 913 | −7.8 | 0.050 | 19.0 |
| --- | --- | --- | --- | --- | --- | --- | --- |
| Example 20 | 992 | 0.038 | 17 | 934 | −5.8 | 0.045 | 18.4 |
| Example 21 | 990 | 0.045 | 22 | 955 | −3.5 | 0.055 | 22.2 |
| Example 22 | 991 | 0.044 | 23 | 921 | −7.1 | 0.052 | 18.2 |
| Example 23 | 990 | 0.055 | 36 | 941 | −4.9 | 0.062 | 12.7 |
| Example 24 | 990 | 0.042 | 19 | 915 | −7.6 | 0.051 | 21.4 |
| Comparative Example 5 | 989 | 0.041 | 19 | 912 | −7.8 | 0.090 | 119.5 |
| Example 25 | 989 | 0.042 | 17 | 914 | −7.6 | 0.051 | 21.4 |
| Example 26 | 991 | 0.041 | 17 | 912 | −8.0 | 0.050 | 22.0 |
| Conventional Example 5 | 989 | 0.062 | 48 | 911 | −7.9 | 0.075 | 21.0 |
| Example 27 | 990 | 0.057 | 40 | 913 | −7.8 | 0.073 | 28.1 |
| Example 28 | 992 | 0.058 | 38 | 934 | −5.8 | 0.069 | 19.0 |
| Example 29 | 990 | 0.062 | 44 | 955 | −3.5 | 0.069 | 11.3 |
| Example 30 | 991 | 0.078 | 78 | 921 | −7.1 | 0.091 | 16.7 |
| Example 31 | 990 | 0.154 | 135 | 941 | −4.9 | 0.174 | 13.0 |
| Example 32 | 988 | 0.057 | 40 | 912 | −7.7 | 0.072 | 26.3 |
| Example 33 | 988 | 0.057 | 40 | 911 | −7.8 | 0.074 | 29.8 |
| Example 34 | 991 | 0.058 | 40 | 913 | −7.9 | 0.073 | 25.9 |
| Example 35 | 990 | 0.056 | 38 | 914 | −7.7 | 0.075 | 33.9 |
| Comparative Example 6 | 992 | 0.056 | 38 | 911 | −8.2 | 0.121 | 116.1 |
| Conventional Example 6 | 988 | 0.068 | 65 | 913 | −7.6 | 0.081 | 19.1 |

Ethylene-propylene rubber was used as sealing rubber.

The aluminum electrolytic capacitor of each of Examples 1 to 6, Examples 7 to 9, and Examples 10 to 12 of the present invention, which has a controlled water content in the electrolytic solution, exhibited significantly suppressed tan δ increase compared with that of the aluminum electrolytic capacitor of each of Comparative Examples 1 to 3 containing a large volume of pure water in the electrolytic solution. Further, the aluminum electrolytic capacitor of each of Examples 1 to 6, Examples 7 to 9, and Examples 10 to 12 of the present invention, which employs the tricyanomethide salt as the electrolyte, exhibited a remarkably reduced impedance compared with that of the aluminum electrolytic capacitor of each of Conventional Examples 1 to 4 employing the conventional electrolyte.

The aluminum electrolytic capacitor of each of Examples 13 to 35 containing a silane coupling agent, sulfolane, or polyalkylene glycol and having a controlled water content of 3.0 wt % or less in the electrolytic solution exhibited a stable change in tan δ, but the aluminum electrolytic capacitor of each of Comparative Examples 4 to 6 containing 4.0 wt % of pure water exhibited a large increase in tan δ.

The aluminum electrolytic capacitor of each of Examples 25 to 35 of the present invention employing the tricyanomethide salt as the electrolyte exhibited a remarkably reduced impedance compared with that of the aluminum electrolytic capacitor of Conventional Example 6 employing the conventional electrolyte.

[Effects of Material of Elastic Sealing Body on Capacitance, Initial Tan δ Property, and Tan δ after High Temperature Application Test]

A capacitor element (rated voltage of 6.3 V-1,000 μF (Φ10×12.5 mmL)) was formed by rolling an anode foil and a cathode foil each subjected to etching treatment and oxide film formation treatment through a Manila hemp-based separator. The capacitor element was impregnated with each of the electrolytic solutions 1, 6, and 8 of Examples of the present invention and the electrolytic solution (electrolytic solution 16) of Conventional Example 1, and was included in a cylindrical outer case having a closed-end and formed of aluminum.

Next, an elastic sealing body formed of ethylene-propylene rubber, resin vulcanized rubber, sulfur-vulcanized butyl rubber, or peroxide partially vulcanized butyl rubber as a sealing body was prepared. Anode and cathode extraction leads were inserted through and extracted from through-holes formed on the elastic sealing body, and the elastic sealing body was attached to the open end of the outer case for sealing through drawing. Thus, ten aluminum electrolytic capacitors each having the sectional structure shown in FIG. 2 were produced.

Capacitance at 120 Hz and initial tan δ property of each of the thus-produced aluminum electrolytic capacitors having a rated voltage of 6.3 V-1,000 μF were measured, and then a high temperature application test (105° C. or 125° C., 3,000 h, DC 6.3 V applied) was conducted. Table 6 shows the results.

TABLE 6

| | Sealing body | Electrolytic solution | Initial properties Capacitance (μF) | Initial properties tan δ | 105° C., Applied voltage of DC 6.3 V, after 3,000 h Capacitance (μF) | 105° C., Applied voltage of DC 6.3 V, after 3,000 h tan δ | Initial properties Capacitance (μF) | Initial properties tan δ | 125° C., Applied voltage of DC 6.3 V, after 3,000 h Capacitance (μF) | 125° C., Applied voltage of DC 6.3 V, after 3,000 h tan δ |
|---|---|---|---|---|---|---|---|---|---|---|
| Example 36 | Ethylene-propylene rubber | Electrolytic solution 1 | 994 | 0.036 | 911 | 0.053 | 994 | 0.036 | 650 | 0.821 |
| Conventional Example 7 | Ethylene-propylene rubber | Electrolytic solution 16 | 988 | 0.055 | 900 | 0.082 | 988 | 0.055 | 500 | 1.520 |
| Example 37 | Resin vulcanized butyl rubber | Electrolytic solution 1 | 996 | 0.034 | 945 | 0.048 | 996 | 0.035 | 815 | 0.288 |
| Example 38 | Resin vulcanized butyl rubber | Electrolytic solution 6 | 997 | 0.035 | 944 | 0.047 | 997 | 0.036 | 805 | 0.278 |
| Example 39 | Sulfur-vulcanized butyl rubber | Electrolytic solution 1 | 994 | 0.036 | 940 | 0.060 | 994 | 0.036 | 700 | 0.556 |
| Example 40 | Peroxide partially vulcanized butyl rubber | Electrolytic solution 1 | 995 | 0.035 | 945 | 0.059 | 995 | 0.035 | 810 | 0.350 |
| Example 41 | Peroxide partially vulcanized butyl rubber | Electrolytic solution 8 | 996 | 0.036 | 940 | 0.058 | 996 | 0.036 | 800 | 0.380 |
| Conventional Example 8 | Resin vulcanized butyl rubber | Electrolytic solution 16 | 972 | 0.054 | 950 | 0.069 | 971 | 0.055 | 753 | 0.438 |
| Conventional Example 9 | Sulfur-vulcanized butyl rubber | Electrolytic solution 16 | 967 | 0.056 | 951 | 0.085 | 967 | 0.056 | 650 | 1.120 |
| Conventional Example 10 | Peroxide partially vulcanized butyl rubber | Electrolytic solution 16 | 970 | 0.055 | 949 | 0.100 | 970 | 0.055 | 750 | 0.550 |

The experimental results shown in Table 6 reveal that initial tan δ property and tan δ after the high temperature application test increased in the case where the electrolytic solution of Conventional Example was used. Further, initial tan δ property and/or tan δ after the high temperature application test increased in the case where the ethylene-propylene rubber or the sulfur-vulcanized butyl rubber was used as the sealing body. Compared with those electrolytic capacitors, the electrolytic capacitor of the present invention employing the elastic sealing body formed of the resin vulcanized butyl rubber or the peroxide partially vulcanized butyl rubber had small initial tan δ and small tan δ after the high temperature application test.

[Effect of Preventing Ooze by Sealing Electrode Extraction Part with Sealing Material]

A capacitor element was formed (rated voltage of 6.3 V-1,000 μF (Φ10×12.5 mmL)) by rolling an anode foil and a cathode foil each subjected to etching treatment and oxide film formation treatment through a Manila hemp-based separator. The capacitor element was impregnated with each of the electrolytic solution 6 of the present invention, the electrolytic solution (electrolytic solution 7) of Comparative Example 1, and the electrolytic solution (electrolytic solution 18) of Conventional Example 3, and then was included in a cylindrical outer case having a closed-end and formed of aluminum.

Anode and cathode extraction leads were inserted through and extracted from through-holes formed on an elastic sealing body formed of butyl rubber, and the elastic sealing body was attached to the open end of the outer case for sealing through drawing. Thus, thirty aluminum electrolytic capacitors each having the sectional structure shown in FIG. 2 were produced, and the electrode extraction leads and the through-holes of each of the electrolytic capacitors were sealed with a sealing material described in Table 7.

The presence or absence of ooze in each of the thus-produced electrolytic capacitors was evaluated. Table 7 shows the results.

TABLE 7

| | Electrolytic solution | Sealing material for cathode extraction part | Initial properties Capacitance (μF) | Initial properties tan δ | 60° C.-95% RH, Applied voltage of DC 6.3 V, after 2,000 h Capacitance (μF) | 60° C.-95% RH, Applied voltage of DC 6.3 V, after 2,000 h tan δ | 60° C.-95% RH, Applied voltage of DC 6.3 V, after 2,000 h Ooze |
|---|---|---|---|---|---|---|---|
| Example 42 | Electrolytic solution 6 | — | 911 | 0.039 | 941 | 0.057 | 3/30 |
| Example 43 | Electrolytic solution 6 | Epoxy | 994 | 0.036 | 931 | 0.058 | 0/30 |
| Example 44 | Electrolytic solution 6 | Xylene | 995 | 0.035 | 930 | 0.059 | 0/30 |
| Example 45 | Electrolytic solution 6 | Guanamine | 996 | 0.035 | 931 | 0.058 | 0/30 |
| Example 46 | Electrolytic solution 6 | Phenol | 995 | 0.036 | 932 | 0.057 | 0/30 |
| Example 47 | Electrolytic solution 6 | Melamine | 993 | 0.035 | 934 | 0.057 | 0/30 |

TABLE 7-continued

| | Electrolytic solution | Sealing material for cathode extraction part | Initial properties | | 60° C.-95% RH, Applied voltage of DC 6.3 V, after 2,000 h | | |
|---|---|---|---|---|---|---|---|
| | | | Capacitance (µF) | tan δ | Capacitance (µF) | tan δ | Ooze |
| Example 48 | Electrolytic solution 6 | Furan | 994 | 0.035 | 931 | 0.058 | 0/30 |
| Comparative Example 7 | Electrolytic solution 7 | — | 992 | 0.038 | 942 | 1.007 | 10/30 |
| Conventional Example 11 | Electrolytic solution 18 | — | 992 | 0.052 | 949 | 0.087 | 3/30 |

Ethylene-propylene rubber was used as sealing rubber.
"—" in Table 7 means that the electrode extraction leads and the through-holes of the electrolytic capacitors were not sealed with a sealing material.

As shown in Table 7, no ooze was observed in the electrolytic capacitor of the present invention including the electrode extraction part sealed with the sealing material. In contrast, a deposit presumably formed from the ooze was observed in the electrolytic capacitor including the electrode extraction part not sealed with the sealing material.

The present invention is not limited to Examples, and similar effects can be obtained with any structure employing the electrolytic solution prepared by dissolving the various compounds described above alone or in combination.

The results of the evaluation reveal that the electrolytic capacitor of the present invention exhibits low impedance property and low equivalent series resistance, has suppressed reduction in capacitance and suppressed increase in tan δ even in a high temperature application test, and has a long-life and high reliability without reduction in withstand voltage.

The invention claimed is:

1. An electrolytic capacitor having a structure in which: a capacitor element, which is formed by rolling an anode foil and a cathode foil each connected with an electrode extraction lead through a separator, and is impregnated with a drive electrolytic solution is included in a cylindrical outer case having a closed-end; and an open end of the outer case is sealed with an elastic sealing body, wherein:
the drive electrolytic solution contains a tricyanomethide salt represented by the below-indicated chemical formula (1); and
the drive electrolytic solution has a water content of 3.0 wt % or less:

(1)

where, R represents a cation pairing with a tricyanomethide ion in formation of a tricyanomethide salt.

2. An electrolytic capacitor according to claim 1, wherein the cation pairing with a tricyanomethide ion in the tricyanomethide salt is selected from the group consisting of: 1-methyl imidazolium; 1-methyl imidazolinium; 1-ethyl imidazolium; 1-ethyl imidazolinium; 1-n-propyl imidazolium; 1-n-propyl imidazolinium; 1,3-dimethyl imidazolium; 1,3-dimethyl imidazolinium; 1,2,3-trimethyl imidazolium; 1,2,3-trimethyl imidazolinium; 1-ethyl-3-methyl imidazolium; 1-ethyl-3-methyl imidazolinium; 1-ethyl-2,3-dimethyl imidazolium; 1-ethyl-2,3-dimethyl imidazolinium; 1,2,3,4-tetramethyl imidazolium; 1,2,3,4-tetramethyl imidazolinium; 1,3-diethyl imidazolium; 1,3-diethyl imidazolinium; 1-methyl-3-n-propyl imidazolium; 1-methyl-3-n-propyl imidazolinium; 2-ethyl-1,3-dimethyl imidazolium; 2-ethyl-1,3-dimethyl imidazolinium; 1,3-dimethyl-n-propyl imidazolium; 1,3-dimethyl-n-propyl imidazolinium; 1,3,4-trimethyl imidazolium; 1,3,4-trimethyl imidazolinium; 2-ethyl-1,3,4-trimethyl imidazolium; and 2-ethyl-1,3,4-trimethyl imidazolinium.

3. An electrolytic capacitor according to claim 2, wherein the tricyanomethide salt comprises one of: 1-ethyl-3-methyl imidazolium tricyanomethide; 1,3-dimethyl imidazolium tricyanomethide; and 1,2,3-trimethyl imidazolium tricyanomethide.

4. An electrolytic capacitor according to claim 2, wherein the drive electrolytic solution contains one or more solvents selected from the group consisting of γ-butyrolactone, sulfolane, 3-methyl sulfolane, ethylene glycol, and polyalkylene glycol and a copolymer thereof.

5. An electrolytic capacitor according to claim 2, wherein the elastic sealing body comprises one of resin-vulcanized butyl rubber and peroxide-vulcanized butyl rubber.

6. An electrolytic capacitor according to claim 2, wherein: the elastic sealing body has through-holes through which the electrode extraction leads are inserted; and the electrode extraction leads and the through-holes are sealed with a sealing material selected from the group consisting of an epoxy resin, a xylene resin, a guanamine resin, a phenol resin, a melamine resin, a furan resin, a silicone resin, a polyimide resin, silicone rubber, and butyl rubber.

7. An electrolytic capacitor according to claim 1, wherein the tricyanomethide salt comprises one of: 1-ethyl-3-methyl imidazolium tricyanomethide; 1,3-dimethyl imidazolium tricyanomethide; and 1,2,3-trimethyl imidazolium tricyanomethide.

8. An electrolytic capacitor according to claim 7, wherein the drive electrolytic solution contains one or more solvents selected from the group consisting of γ-butyrolactone, sulfolane, 3-methyl sulfolane, ethylene glycol, and polyalkylene glycol and a copolymer thereof.

9. An electrolytic capacitor according to claim 7, wherein the elastic sealing body comprises one of resin-vulcanized butyl rubber and peroxide-vulcanized butyl rubber.

10. An electrolytic capacitor according to claim 7, wherein: the elastic sealing body has through-holes through which the electrode extraction leads are inserted; and the electrode extraction leads and the through-holes are sealed with a sealing material selected from the group consisting of an epoxy resin, a xylene resin, a guanamine resin, a phenol resin, a melamine resin, a furan resin, a silicone resin, a polyimide resin, silicone rubber, and butyl rubber.

11. An electrolytic capacitor according to claim 1, wherein the drive electrolytic solution contains one or more solvents selected from the group consisting of γ-butyrolactone, sulfolane, 3-methyl sulfolane, ethylene glycol, and polyalkylene glycol and a copolymer thereof.

12. An electrolytic capacitor according to claim 11, wherein the elastic sealing body comprises one of resin-vulcanized butyl rubber and peroxide-vulcanized butyl rubber.

13. An electrolytic capacitor according to claim 11, wherein: the elastic sealing body has through-holes through which the electrode extraction leads are inserted; and the electrode extraction leads and the through-holes are sealed with a sealing material selected from the group consisting of an epoxy resin, a xylene resin, a guanamine resin, a phenol resin, a melamine resin, a furan resin, a silicone resin, a polyimide resin, silicone rubber, and butyl rubber.

14. An electrolytic capacitor according to claim 1, wherein the elastic sealing body comprises one of resin-vulcanized butyl rubber and peroxide-vulcanized butyl rubber.

15. An electrolytic capacitor according to claim 14, wherein: the elastic sealing body has through-holes through which the electrode extraction leads are inserted; and the electrode extraction leads and the through-holes are sealed with a sealing material selected from the group consisting of an epoxy resin, a xylene resin, a guanamine resin, a phenol resin, a melamine resin, a furan resin, a silicone resin, a polyimide resin, silicone rubber, and butyl rubber.

16. An electrolytic capacitor according to claim 1, wherein: the elastic sealing body has through-holes through which the electrode extraction leads are inserted; and the electrode extraction leads and the through-holes are sealed with a sealing material selected from the group consisting of an epoxy resin, a xylene resin, a guanamine resin, a phenol resin, a melamine resin, a furan resin, a silicone resin, a polyimide resin, silicone rubber, and butyl rubber.

* * * * *

UNITED STATES PATENT AND TRADEMARK OFFICE
CERTIFICATE OF CORRECTION

PATENT NO. : 8,116,069 B2  
APPLICATION NO. : 12/096418  
DATED : February 14, 2012  
INVENTOR(S) : Tani et al.

Page 1 of 1

It is certified that error appears in the above-identified patent and that said Letters Patent is hereby corrected as shown below:

On the title page, item [73] Assignees delete:

"Nichicon Corporation, Kyoto (JP)  
Nippon Shokubai Co., Ltd, Osaka (JP)"

And insert:

--[73] Assignees:

Nichicon Corporation, Kyoto (JP)--

Signed and Sealed this  
Twenty-second Day of April, 2014

Michelle K. Lee  
*Deputy Director of the United States Patent and Trademark Office*